A. B. LOW.
VULCANIZER.
APPLICATION FILED OCT. 19, 1915.
1,315,731.
Patented Sept. 9, 1919.
2 SHEETS—SHEET 1.
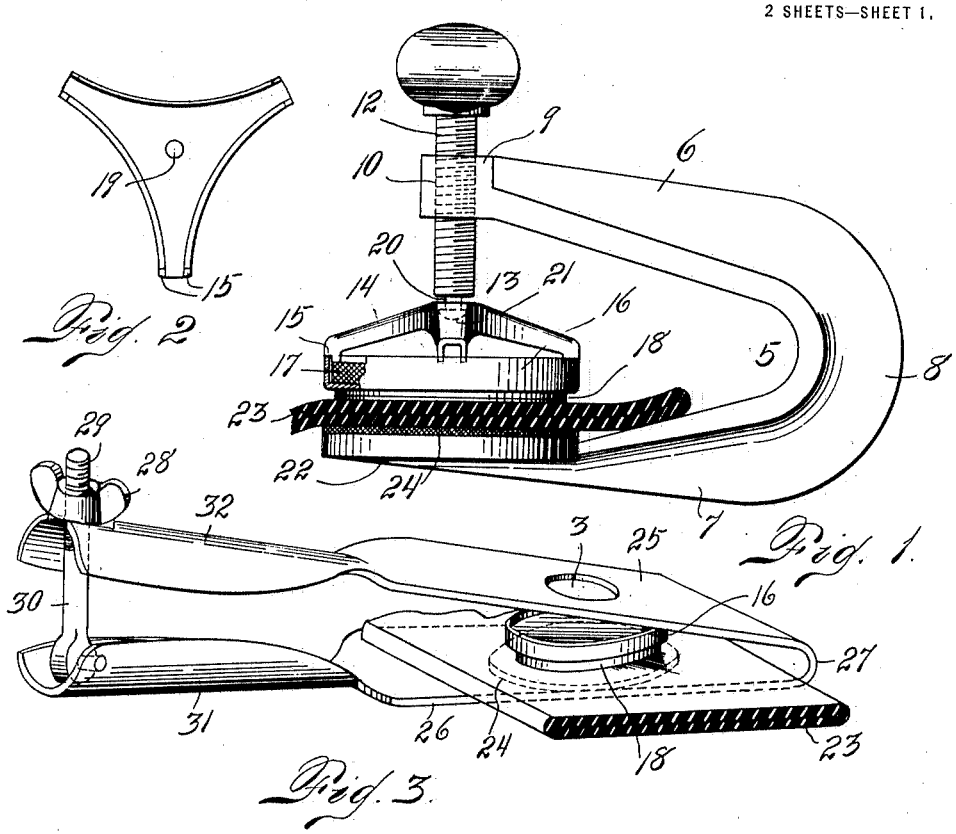
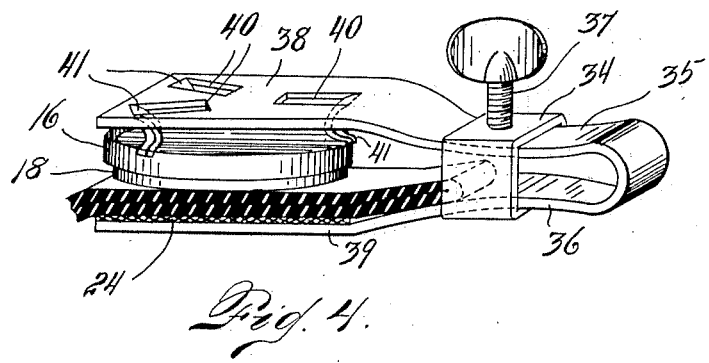

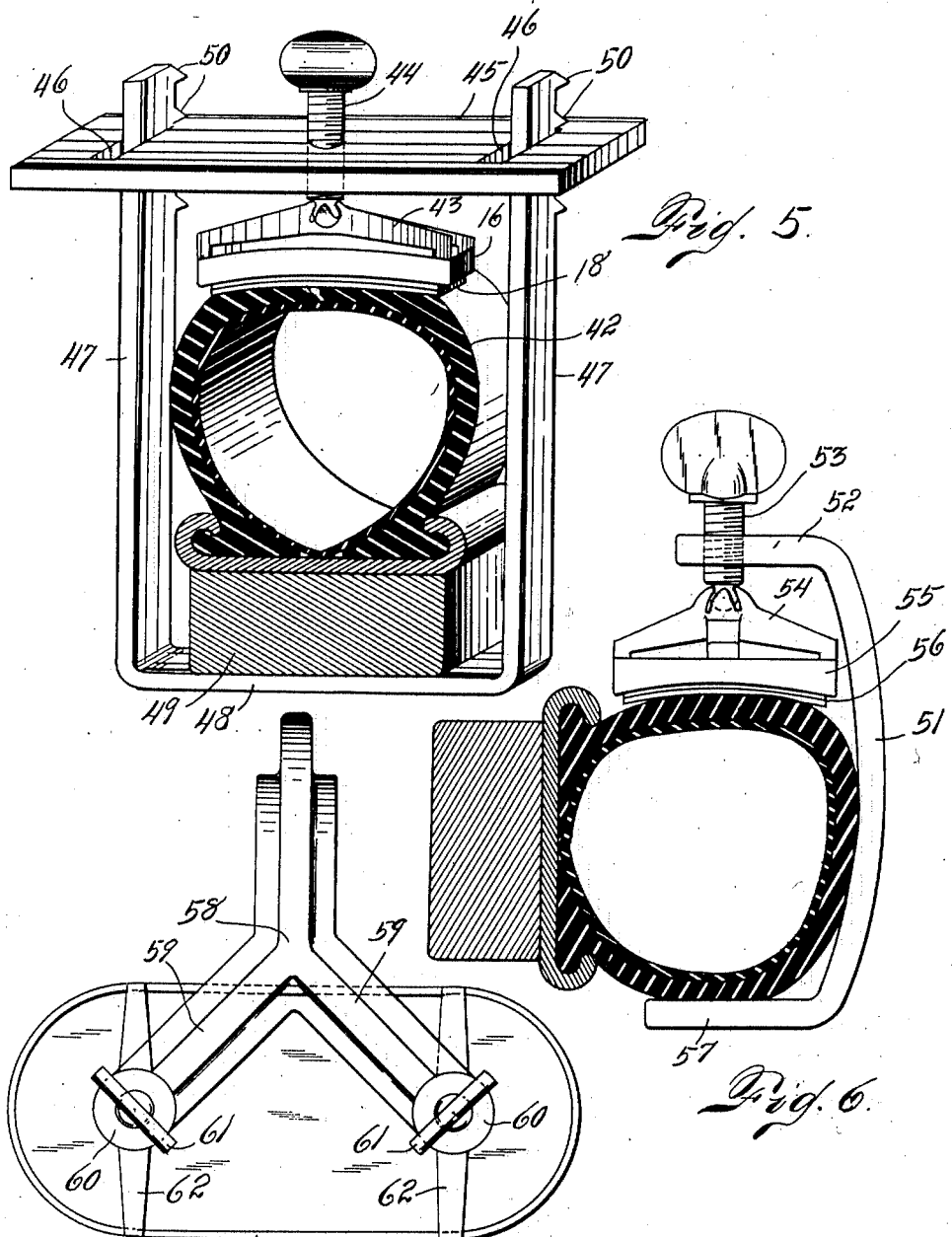

UNITED STATES PATENT OFFICE.

ARTHUR B. LOW, OF DENVER, COLORADO, ASSIGNOR TO ANNA M. DARRAGH, OF DENVER, COLORADO.

VULCANIZER.

1,315,731.  Specification of Letters Patent.  Patented Sept. 9, 1919.

Application filed October 19, 1915. Serial No. 56,789.

*To all whom it may concern:*

Be it known that I, ARTHUR B. LOW, a citizen of the United States, residing at the city and county of Denver and State of Colorado, have invented certain new and useful Improvements in Vulcanizers; and I do declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to a clamping device specially adapted for use in connection with the vulcanizing package disclosed in my previous application, Serial No. 45,656, filed August 16, 1915, of which the present application is a continuation in part. My object, as heretofore indicated, is to provide an efficient device of simple and economical construction for use in applying patches to tubes or casings by the employment of a vulcanizing process.

A device of this character must be of such construction as to securely hold the vulcanizing package in place upon the tire to be mended, and in addition must be of such construction as to afford an even support having an area at least equal to that of the patch to be applied, this support being arranged in opposing relation to the movable member of the clamping device. It will be understood that it is exceedingly important in applying a patch by the vulcanizing process, that an even pressure be employed over the entire surface both above and below the patch. It is also important that provision be made for conserving the heat generated by the combustible portion of the package since the combustible element must necessarily be of such quantity only as is necessary, since if there is too much heat the tire will be destroyed, while if there is not sufficient the vulcanizing process will not be carried out. In other words, the operation is rather a delicate one since the range of variation so far as heat and pressure are concerned is confined within very narrow limits, hence the necessity of a proper clamping device and also the necessity of making provision for conserving the heat, in order that the same amount of fuel may be adapted for use under varying weather temperature conditions.

In the drawing I have illustrated a number of different forms of construction that may be employed.

Figure 1 is a side elevation partly in section of my preferred form of clamp.

Fig. 2 is an underneath view of the tripod portion of this device.

Figs. 3 and 4 are perspective views of other forms of construction that may be employed.

Fig. 5 is a perspective view of a clamp adapted for use in applying a patch to the shoe or relatively thick outer member of a pneumatic tire, assuming that the tire is inflated sufficiently to afford the necessary resistance.

Fig. 6 is an other form of construction that may be employed for the same purpose.

Fig. 7 is a top plan view of a device of the general construction shown in Fig. 1 except that it is adapted for applying a relatively large patch, two clamping screws being employed.

The same reference characters indicate the same parts in the different views.

Referring first more particularly to Fig. 1 of the drawing, let the numeral 5 designate the rigid body member of my improved clamp, this member having upper and lower arms 6 and 7 connected at 8 by an abrupt bend, whereby the two arms are oppositely disposed, one directly above the other and suitably spaced for the purpose. The upper arm 6 terminates at its forward extremity in a member 9 having a threaded perforation 10 adapted to receive a screw 12 whose lower extremity supports a tripod member 13, the connection between the screw and this member being such that the tripod has sufficient movement to adjust itself to the part which it engages, as the screw is tightened. As shown in the drawing, the tripod is composed of a sheet metal stamping, its arms 14 being U-shaped at their outer extremities and recessed as shown at 15 to receive the upper edge of a small pan or receptacle 16 adapted to contain the necessary combustible material 17 for generating the heat necessary to apply the patch which is designated by the numeral 18. The central portion of this tripod member is provided with a perforation 19 through which the reduced extremity 20 of the screw is first inserted from above, after which the lower end of this reduced extremity is upset to form a head 21 which maintains the two parts in the assembled relation but allows sufficient lateral movement of the tripod for the purpose. The lower arm 7 of the body of the clamp merges at its outer extremity into a disk shaped member 22 which is formed sufficiently large to afford a firm support for the tube 23 during the process of applying the patch. This member 22 has a perfectly flat, smooth upper surface, to which is applied a layer 24 of felt or other suitable material which is a poor conductor of heat and which will prevent the dissipation of the heat by conduction through the metal member of the clamp below the vulcanizing package.

In the form of construction shown in Fig. 3 the clamp is composed of upper and lower members 25 and 26 which merge into each other at 27, the material having sufficient yielding capacity to allow the upper and lower members to be drawn toward each other by turning a wing nut 28 on the threaded extremity 29 of a screw pin 30 which is connected at its lower extremity with the lower arm 31 of the clamp, the upper arm 32 being perforated to receive the screw pin. In this case the upper member of the clamp is provided with an opening 3 through which the combustible material within the pan 16 may be ignited after the two members of the clamp are tightened upon the patch. In this case the lower member of the clamp is perfectly flat and is equipped with a layer 24 of non-heat-conducting material which performs the same function as in the form of construction shown in Fig. 1.

In Fig. 4 I have illustrated a form of clamp very similar to that shown in Fig. 3, except that a band 34 is applied to the upper and lower arms 35 and 36 and has a threaded perforation to receive a screw 37, the lower end of the screw bearing upon the upper arm of the clamp. The upper and lower jaws 38 and 39 of the clamp are arranged in opposing relation and between them is located the pan 16 carrying the patch 18. The lower jaw is flat and equipped with the layer 24 of felt or other suitable material. The upper jaw 38 is provided with a number of elongated perforations 40 out of which is punched a corresponding number of depending projections 41 which are adapted to engage the upper edge of the pan 16 when the clamp is applied to the package for vulcanizing purposes.

The form of construction shown in Fig. 5 is adapted for use with my improved vulcanizing package when employed in vulcanizing a patch upon the shoe 42 of a tire. In this case it is assumed that the tire is sufficiently inflated to offer the resistance necessary to the clamping member 43 which is similar in construction and arrangement to that shown in Fig. 1 and consists of a number of arms engaging the upper edge of the pan 16 containing combustible material and acting on the patch 18. In this form of construction the screw 44 is threaded into a movable top plate 45 having elongated openings 46 adapted to receive the upright parallel arms 47 of the body member of the clamp, the said arms being connected at the bottom by a transverse member 48 upon which the felly 49 of the wheel rests. It will be understood that this view shows in cross section a tire applied to the rim of a wheel. The upper portions of the arms 47 are toothed as shown at 50 for retaining the plate 45 in the desired position of vertical adjustment.

In Fig. 6 I have illustrated a clamp adapted for use in a similar manner as that shown in Fig. 5, except that in Fig. 6 the clamp is also adapted for employment in applying a patch to the side as well as to the tread of the shoe. In this case the body 51 of the clamp is U-shaped, its upper parallel arm 52 having a threaded perforation to receive a screw 53 which carries a movable clamping member 54 which acts upon the pan 55 to apply a patch 56. The lower parallel member 57 of the body of the clamp engages the opposite side of the tire from that to which the patch is applied, while the upright member 51 of the body of the clamp engages the tread of the tire.

In the form of construction shown in Fig. 7 the clamp is similar to that shown in Fig. 1 except that from a point 58 in its upper arm two arms 59 extend approximately at right angles to each other and terminate in threaded members 60 which receive screws 61 carrying movable clamping devices 62 which act upon the upper edge of an elongated fuel containing pan 63. This construction is used in the same manner as the device shown in Fig. 1, except that two screws must be manipulated instead of one, and a relatively large patch may be applied, the fuel containing pan 63 being correspondingly large.

It will be noted that in all forms shown the pan has upstanding sides and that the body of solid fuel is properly proportioned and shaped to fit neatly within the pan. This is an extremely important feature in that the air is thereby prevented from passing around the sides of the fuel and working under it. Since the fuel composition which applicant proposes to use does not depend upon the oxygen of the air for its combustion, but affords its own supply of oxygen, any access of the air to the sides or bottom of the fuel body will cause too rapid combustion, resulting in too high a temperature, in which case the fuel is apt to burst into flame which will cause it to warp upwardly so that the air will flow still more readily around and under the fuel body. But by proportioning the fuel body as shown, proper conditions as regards the fuel are maintained, the combustion is properly retarded, and the proper uniform temperature results.

From the foregoing description the operation of my improved clamp as well as its advantages will, it is believed, be readily understood without further explanation in detail.

Having thus described my invention, what I claim is,—

1. A clamping device comprising spaced members, one member having a flat portion of suitable area and the other member having a number of arms whose extremities are shaped to facilitate the accurate centering of the article to be engaged thereby.

2. A clamping device comprising spaced members, one of which has a flat portion of suitable area, while the other is provided with a number of arms whose extremities are angle-shaped to engage the edge and inner surface of a pan forming a part of a package to be acted on by the clamp.

3. A clamping device comprising spaced members, one of which has a flat portion of suitable area, while the other has a number of arms whose extremities are notched to engage the edge and the inner surface adjacent the edge of a pan upon which the clamp acts.

4. A clamp, one of whose members is equipped with a number of radial arms whose outer extremities are shaped to facilitate the accurate centering of the package to which the pressure is to be applied.

5. A clamp, one of whose members is disk-shaped and arranged in opposing relation to the other member which is equipped with arms whose outer extremities are shaped to facilitate the centering of an article with reference to the disk-shaped part of the first named member.

6. A clamp, one of whose members has a flat surface arranged in opposing relation to the other member which is equipped with arms whose outer extremities are shaped to facilitate the positioning of an article with reference to the flat surface of the first named member.

7. A tire tube vulcanizer, comprising a U member, and means for clamping a tire tube between the arms of said U member, said clamping means embodying a cup adapted to contain a combustible medium, said cup being engaged at its rim to clamp the same against the tire tube and to retain it against lateral movement.

8. A tire tube vulcanizer, comprising a U member, and means for clamping a tire tube between the arms of said U member, said clamping means including a cup adapted to contain a combustible medium and so disposed as to direct the heat of the combustible medium when ignited away from the surface to be vulcanized, said cup being engaged at its rim to clamp the same against the tire tube and to retain it against lateral movement.

9. A vulcanizer comprising a base member and an opposing member and means for clamping an object between the members, said clamping means embodying a cup adapted to contain a combustible medium, means engaging said cup at its rim to clamp the same against the object on the base member, said means being swingingly and adjustably connected with said opposing member.

10. A vulcanizer comprising a base member and an opposing member, and means for clamping an object between the members, said clamping means including a cup positioned between said members and adapted to contain a combustible medium, means engaging said cup at its rim to clamp the same against the object on the base and to retain it against lateral displacement, said engaging means being swingingly and adjustably mounted in said opposing member.

In testimony whereof I affix my signature in presence of two witnesses.

ARTHUR B. LOW.

Witnesses:
GRACE HUSTON,
A. EBERT O'BRIEN.